3,701,764
PROCESS FOR THE FRACTIONATION
OF POLYMERS
Bartholomew Hargitay, White Plains, N.Y., assignor to
Union Carbide Corporation
Filed Aug. 26, 1968, Ser. No. 755,087
Int. Cl. C08f 1/94
U.S. Cl. 260—88.3        2 Claims

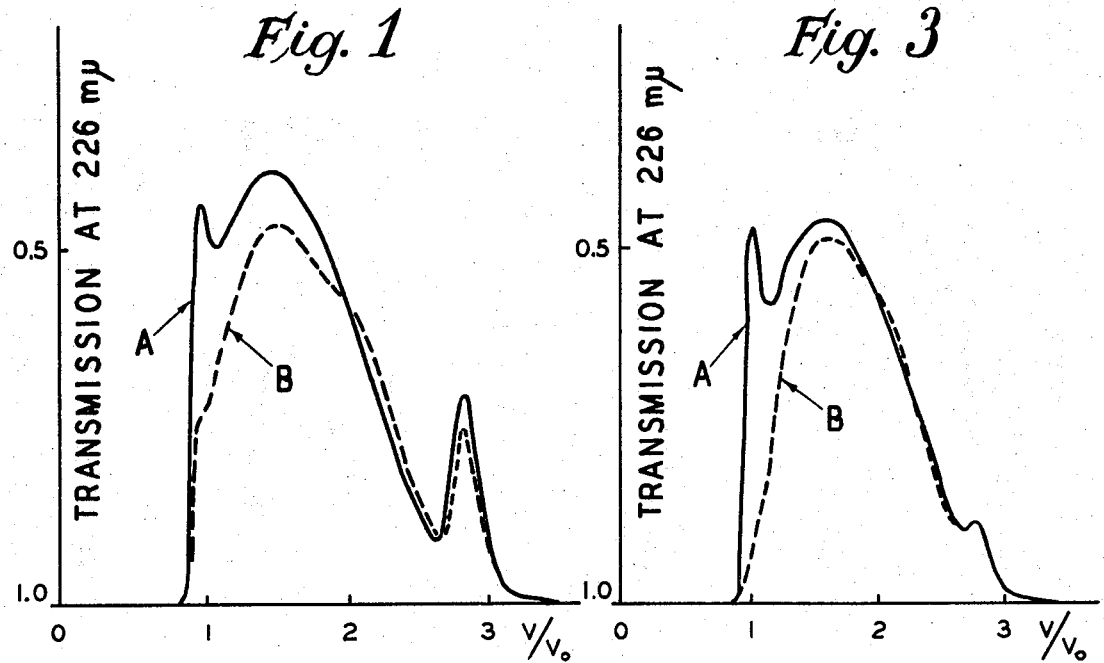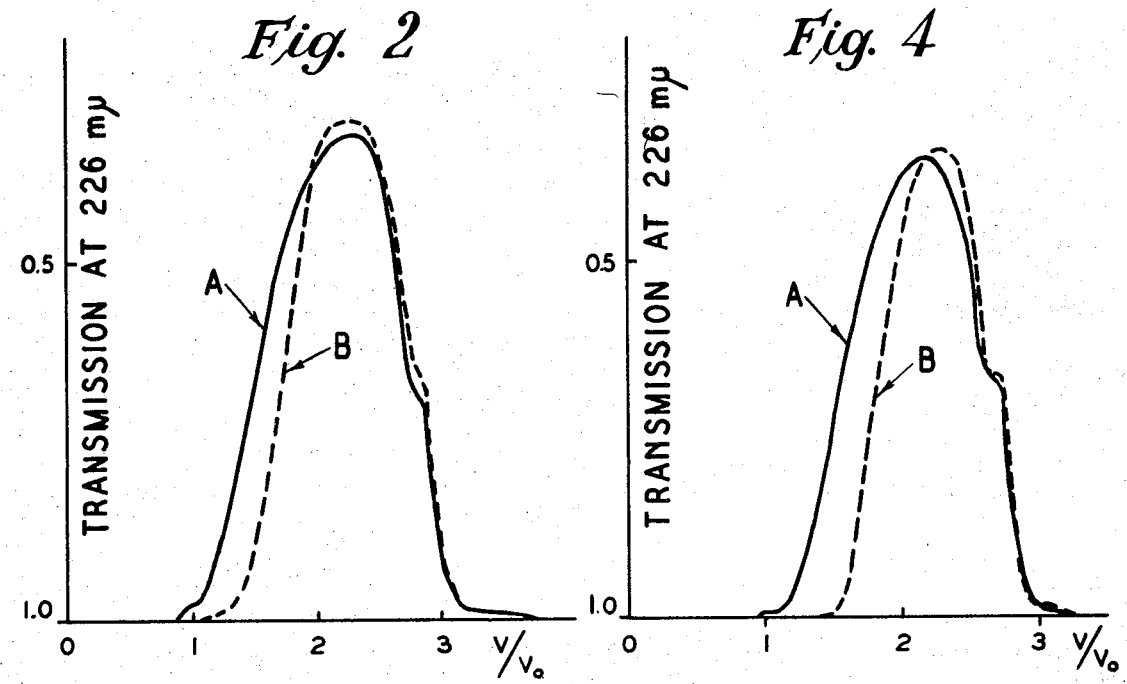

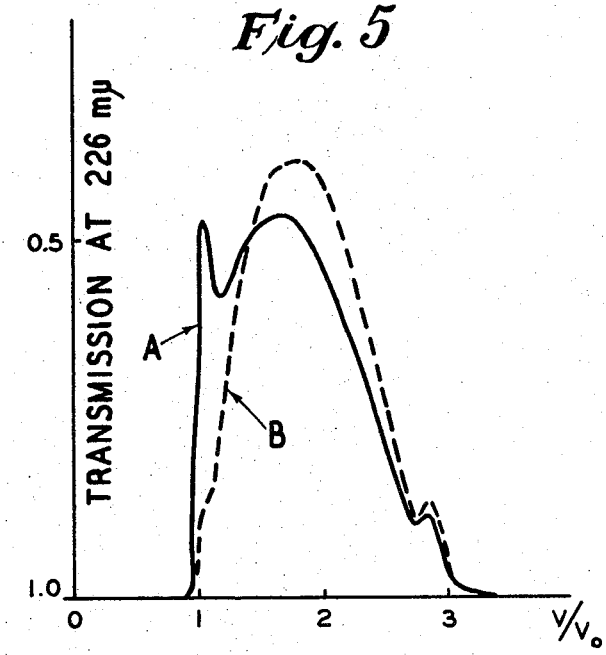
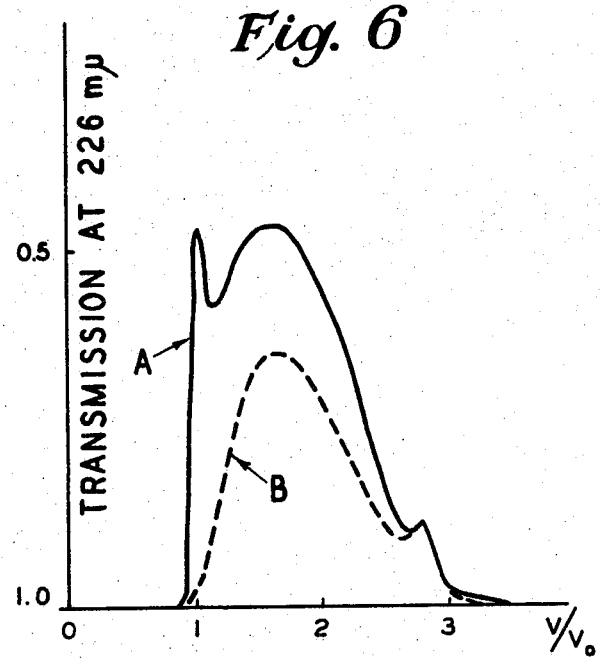

ABSTRACT OF THE DISCLOSURE

Separation of the highest molecular weight fraction from polymers can be achieved by the selective formation in the homogeneous phase of soluble molecular complexes of the highest molecular weight fraction with specific other macromolecules and thereafter isolating the complexes from the polymers.

---

This invention relates to a process for the fractionation of polymers. In one aspect, this invention relates to a process for the separation of the highest molecular weight fraction from polymers which initially have a relatively wide molecular weight distribution. In a further aspect, this invention is directed to a process for the elimination of the highest molecular weight fraction from poly(vinylpyrrolidone).

Prior to the present invention, fractionation of polymers was a tedious and time consuming task. Inasmuch as fractionation entails the separation of compounds of identical chemical structure and properties which are distinguishable from each other only by subtle physical measurements, special techniques must be employed. However, to date, none of the methods available is without its disadvantages. For example, conventional fractionation techniques require the use of very dilute solutions, usually less than 5 percent, very precise control of temperature and long periods of time, up to several days, for equilibration between separating phases. Moreover, conventional fractionation frequently requires the use of large quantities of solvents which are often volatile, toxic, or highly flammable and which renders large scale operation undesirable.

Although other methods of fractionation are known which are not based on solvent-non-solvent techniques due to their low capacity and the necessity for employing only very dilute polymer solutions, they remain largely an analytical tool in the field of polymers. For example, polymer fractionation can be effected by gel-permeation chromatography which, as a multi-stage column process, is capable of high resolution. However, since the gels employed are usually molecular sieves of relatively low capacity, only small quantities of polymers can be chromatographed. The process is therefore not suitable for many applications and hence is never used for industrial fractionation on a large scale. Thus, until the discovery of the instant invention, there has been no efficient and economical method for the fractionation of polymers.

It is therefore an object of this invention to provide a novel process for the fractionation of polymers. A further object of this invention is to provide a novel process wherein polymer fractionation can be effected quickly and efficiently. Another object is to provide a process which is suitable for large scale applications. Another object of this invention is to provide a novel process for the selective separation of the highest molecular weight fraction from polymers having a relatively wide molecular weight distribution. A further object is to provide a novel process for the elimination of the highest molecular weight fraction from poly(vinylpyrrolidone). A still further object of this invention is to provide a process for removing high molecular weight fractions from poly(vinylpyrrolidone) by the formation in the homogeneous phase of soluble molecular complexes of the high molecular weight fraction with other macromolecules, and thereafter isolating the complexes formed. Another object is to provide poly(vinylpyrrolidone) having a narrow molecular weight distribution which renders it ideally suitable for biological applications. These and other objects will readily become apparent to those skilled in the art in the light of the teachings herein set forth.

In a broad aspect, this invention relates to a novel process for the separation of the highest molecular weight fraction from polymers having a relatively wide molecular weight distribution. The process comprises the steps of:

(a) forming a solution of a polymer which has a relatively wide molecular weight distribution,
(b) contacting the solution with less than an equivalent of an auxiliary polymer which reversibly forms a complex with the highest molecular weight fraction in the homogeneous phase,
(c) separating the complex formed, and
(d) recovering the polymer freed from its highest molecular weight fraction.

The advantage of the present invention will readily become apparent upon reference to the drawings in which FIGS. I–VI are graphic views reflecting the molecular weight distribution of six samples of poly(vinylpyrrolidone).

The molecular weight distribution was determined by gel chromatography of poly(vinylpyrrolidone) samples before and after fractionation. The samples employed were 0.20 milliliter of 5 weight percent solutions of poly(vinylpyrrolidone) in water. The samples were passed through a 470 x 12 millimeter column at a rate of 25 centimeters per hour and monitored at 226 m$\mu$ in a 1 centimeter optical path flow cell. The gel employed was Agarose A 0.5 m. (200–400 mesh) and the eluent was 0.1 N NaCl in water.

As indicated in the examples, curve A in each instance represents the molecular weight distribution of the poly(vinylpyrrolidone) prior to fractionation treatment. Curve B represents the molecular weight distribution of the poly(vinylpyrrolidone) after removal of the highest fraction.

FIG. I is a gel chromatogram depicting the molecular weight distribution of a poly(vinylpyrrolidone) sample characterized by an initial relative viscosity of 1.237 in one weight percent aqueous solution. Curve A represents the molecular weight distribution prior to fractionation. Curve B represents molecular weight distribution after removal of the highest 15 percent using polyacrylic acid as the complexing agent.

FIG. II is a gel chromatogram depicting the molecular weight distribution of a poly(vinylpyrrolidone) sample characterized by an initial relative viscosity of 1.090 in one weight percent aqueous solution. Curve A represents the molecular weight distribution prior to fractionation and Curve B the distribution after removal of the highest 15 percent with polyacrylic acid.

FIG. III is a gel chromatogram depicting the molecular weight distribution of a poly(vinylpyrrolidone) sample characterized by an initial relative viscosity of 1.236 in one weight percent aqueous solution. Curve A represents the distribution prior to fractionation while Curve B represents the distribution after removal of the highest 30 percent with polyacrylic acid.

FIG. IV is a gel chromatogram depicting the molecular weight distribution of a poly(vinylpyrrolidone) sample characterized by an initial relative viscosity of 1.090 in one weight percent aqueous solution. Curve A represents the distribution prior to fractionation while Curve B represents the distribution after removal of the highest 30 percent wtih polyacrylic acid.

FIG. V is a gel chromatogram showing the molecular weight distribution of a sample of poly(vinylpyrrolidone) having an initial relative viscosity of 1.236 in one weight percent aqueous solution. Curve A is the distribution of the polymer prior to fractionation and Curve B after removal of the highest 30 percent, with a copolymer of ethylene and maleic acid.

FIG. VI is a gel chromatogram depicting the molecular weight distribution of poly(vinylpyrrolidone) having an initial relative viscosity of 1.236 in one weight percent aqueous solution. Curve A is the molecular weight distribution prior to fractionation and Curve B after removal of the highest 30 percent with a crosslinked polymer of ethylene and maleic acid.

As is evident from FIGS. I–VI and the detailed description which follows, the process of the present invention provides a separation of the highest molecular weight fraction from polymers having a relatively wide molecular weight distribution. In contrast to the few techniques presently available, this invention provides a process which is fast and efficient and yet provides excellent selective removal of the highest molecular weight fraction. The remaining polymer contains essentially no fraction above a specified molecular weight range. Moreover, the process of the present invention is operative in relatively concentrated solutions, is insensitive to temperature variations and can be conducted in a relatively short period of time.

Although the process is useful for removing the highest molecular weight fraction from a variety of polymers, it is of particular interest in the removal of the highest molecular weight fraction from poly(vinylpyrrolidone). Poly(vinylpyrrolidone) is known to be a biologically inert, compatible, water soluble polymer. Because of its lack of both toxicity and antigenicity it has been employed as a plasma-extender when whole blood is not available for transfusions and as a cryoprotective agent in the preservation of injectable red blood cells that are stored at liquid air temperatures. For example, G. F. Doebbler et al. has reported in Biochim Biophys. Acta 58:449 (1962) the use of poly(vinylpyrrolidone) in protecting erythrocytes from freeze damage. It is also known that poly(vinylpyrrolidone) is not biologically degraded and, therefore, it is excreted through the kidney unchanged. However, the kidney being also an ultrafilter, it only allows the passage of molecules having an average diameter below about 40 angstroms in solution as reported by Scholtan et al., Z. Ges. Expt. Med. 130, 577–603 (1959), and 130, 556–576 (1959). Hence, an upper limit is set for the molecular weight of poly(vinylpyrrolidone) which can be employed for this purpose.

It is also known that the polymerization of N-vinylpyrrolidone leads to an excessively wide molecular weight distribution. As a consequence, poly(vinylpyrrolidone), the average molecular weight of which is high enough to exhibit the desired biological properties, contains as much as 30 to 50 percent of its weight of a high molecular weight fraction that is not excreted by the kidney. This material is retained in the body, particularly in the liver as reported by P. Tothill, J. Nuclear Medicine 9 582–587 (1965), which is undesirable from the medical point of view. However, by the process of this invention the highest molecular weight fraction can be removed selectively, leaving a polymer that contains essentially no fraction above a molecular weight range previously selected. For example, if a polymer is desired which is free from all fractions over a molecular weight of say 35,000, it is possible to start with a polymer having a molecular weight distribution of from about 15,000 to about 40,000 and remove selectively the undesired highest fraction. From an economic point of view as well as ease of operation, the polymer chosen should have a minimum amount of the fraction to be removed so that the yield of the desired product will be high.

Although poly(vinylpyrrolidone) is of particular interest due to stringent biological requirements for its use, the process of this invention is applicable to a wide variety of organic polymers. The only limitations on the polymer are (1) that it be one in which its highest molecular fraction is capable of forming a complex in the homogeneous phase with an auxiliary polymer and (2) that the formed complex be separable from the excess of freed polymer by acceptable techniques.

In addition to poly(vinylpyrrolidone) the process has been shown to be particularly applicable for fractionation of other polymers such as high molecular weight poly(ethylene oxide) e.g., (Polyox), poly(acrylic acid), copoly(ethylenemaleic acid) and the like.

As hereinbefore indicated, separation of the high molecular weight fraction from polymers is achieved by the formation in the homogeneous phase of a complex of the highest molecular weight fraction with less than an equivalent of an auxiliary polymer, followed by separation of the complex formed.

While not wishing to be bound by any theory regarding the mechanism by which the process of this invention is effected, a brief discussion of what is believed to happen will be of possible assistance.

The reactions envisioned are of the nature of polymer-polymer complex interactions. In this class of reactions are included all such interactions between two unlike macromolecules, in which by virtue of the periodicity along the chains of both molecules the same type of interaction can take place repeatedly along extended stretches of each of the chains. It is essential for the success of the method, that the periodicity of the two interacting chains bear a relationship to one another so that periodic interactions over considerable lengths along the chain can occur. It is however not necessary that the periodicity be exactly the same because folding, spiraling and bending of one or both chains can accommodate a good deal of mismatching if the energy of interaction is high enough. As far as the nature of the interactions is concerned this may be diverse, such as electrostatic, H-bonding, dipole-dipole, van der Waals, hydrophobic and a combination of these.

A variety of polymers, such as poly(vinylpyrrolidone), have been known to form stable and largely insoluble complexes with a great number of H-bonding compounds including macromolecules, such as tannic acid, polyacrylic acid, copolymers of acrylic acid, maleic acid, etc. Such complexes may in themselves have interesting and desirable properties and have therefore attracted some interest in the past. However, these macromolecular complexes have been prepared by mixing the interacting polymers in such a ratio as to achieve complete insolubilization, i.e., complete mutual saturation (equivalence). As used in the specification and appended claims by the term "equivalents" is meant—ratio of components as found in the complex formed under equilibrium conditions.

It has now been found, that when a polymer such as poly(vinylpyrrolidone) is mixed with a suitable complexing agent in a less than stoichiometric ratio, only a fraction of the polymer is complexed leaving the excess in the free, non-complexed state. The complex formed is essentially stoichiometric, i.e., it is thermodynamically more favorable to have stoichiometric complex plus free polymer than a non-stoichiometric complex. Moreover, this complex formation, when performed in the homogeneous phase, is extremely selective, and will involve preferentially the longest polymer chains present. It could be shown, that if a soluble macromolecular complex of a polymer, such as poly(vinylpyrrolidone) is mixed with an excess of a higher molecular weight, poly(vinylpyrrolidone), in less than a couple of minutes total exchange takes place, i.e., the longest poly(vinylpyrrolidone) chains displace the shorter one in the complex. It is therefore evident, that selectively the longest poly(vinylpyrrolidone) chains are altered physio-chemically (complexed) while the shortened ones remain unaltered (free). The ratio of complexed to free poly(vinylpyrrolidone) can be chosen at will, by simply varying the proportion of the added complexing agent from 0 to 1. Moreover, it can also be shown, that the fraction of the complex polymer is proportional to the auxiliary polymer added. Thus, it is evident, that under non-stoichiometric conditions the complex formation is a reversibly competitive reaction, as long as it occurs in the homogeneous phase. Conversely, it can be shown, that if the complex formation takes place under conditions where phase separation occurs (precipitation) then even with non-stoichiometric ratios the selectivity is lost and a fractional precipitation occurs with no or only insignificant change in molecular weight distribution.

In general it has been observed that wide variety of macromolecules can serve as the auxiliary polymer. The auxiliary polymer must, of course, be capable of forming a complex with the highest molecular weight fraction of the other polymer and this complex easily separated. Among the many macromolecules which can be employed are the regular linear polymers of organic acids. In the practice of this invention the preferred macromolecules are the polymers and certain copolymers of organic acids, such as maleic acid, fumaric acid, acrylic acid, methacrylic acid, crotonic acid, 3-butenoic acid and the like.

Particularly preferred auxiliary polymers include polyacrylic acid, linear or branched, and copolymers of ethylene and maleic acid, linear or branched.

The complexes formed with these polymers and, for example, poly(vinylpyrrolidone), are soluble above pH=4, in high dilution and in the absence of salt as low as pH=3. Potentiometric titration of sodium-polyacrylate with HCl in the presence and absence of an excess of poly(vinylpyrrolidone) reveals that essentially no complex forms above pH=6, while complex formation is about complete at pH=3. Therefore, in the preferred method of operation a partially neutralized polyacid is mixed with the poly(vinylpyrrolidone) solution. Complex formation is shown by the fact that mixing a poly(vinylpyrrolidone) solution of pH=3.5 and a partially neutralized polyacrylic acid soln. of pH=4.2 yields a solution of pH~4.8, i.e. NaOH is liberated.

In practice, the amount of auxiliary polymer to be employed will, of course, be dependent upon how large a fraction is to be removed. In all cases the amount employed will be less than an equivalent amount to the polymer being subjected to fractionation. In the case of poly(vinylpyrrolidone) the amount of polyacrylic acid or copoly(ethylene-maleic acid) can be calculated by the formula:

$$\text{Polyacid (grams)} = \alpha \frac{72}{111} \text{PVPo (grams)}$$

where $\alpha$ is the fraction of poly(vinylpyrrolidone) to be removed, and PVPo the original amount of poly(vinylpyrrolidone).

After the two polymer solution have been mixed, a strong acid is added under constant and vigorous stirring until the pH drops to about 4. The addition of the acid must be gradual enough to avoid local precipitation. A variety of acids can be employed to adjust the pH. Illustrative acids include, among others, the mineral acids, such as hydrochloric acid, nitric acid, sulfuric acid, phosphoric acid and the like, and strong organic acids, such as formic or acetic acid and the like. The complex formed is intrinsically hydrophobic and is kept in solution by its residual negative charge originating from the dissociation of the acid groups.

In the next step, the complex is separated from the polymer by one of several methods. Depending upon the choice of polymer and auxiliary polymer, the method of separation selected can vary considerably. In the fractionation of poly(vinylpyrrolidone) it has been found that separation of the complex can be conveniently achieved through precipitation. For example, on adding a stronger acid, e.g., a mineral acid, the dissociation and with it the charge of the colloid complex is suppressed and precipitation occurs. The initially spongy precipitate undergoes syneresis and in the course of several hours an appreciable amount of clear, dilute poly(vinylpyrrolidone) solution is expelled. This syneresis can be accelerated by mechanical working of the curd-like mass.

It should be noted that while the selectivity of complex formation is almost as good in concentrated solution (e.g. 50% poly(vinylpyrrolidone)), when $\alpha$ is selected higher than a few percent, large volumes of supernatant are temporarily retained by the curd, leading to unnecessary losses. For this reason, it is preferred to work under more dilute conditions. As a guide the product $\alpha \times$ PVPo should be less than about 10% of the total weight of the reaction mixture. However, this is no theoretical limit and only refers to the ease of operation.

Precipitation is carried out by adding a strong mineral acid (HCl, $HNO_3$, $H_2SO_4$, $H_3PO_4$, etc.) under extremely vigorous stirring until pH <2.5. Ideally, no lumps should form but a uniform flaky precipitate of small particle size (<1 mm). Being hydrophobic in nature, the flakes gather in the froth. As a rule, several minutes of high shear stirring will suffice to produce a clean separation into a manageable precipitate and clear solution. The precipitate can be lifted off with the foam essentially quantitatively and only a few flakes will cling to the walls of the container.

The clear solution contains in addition to the desired poly(vinylpyrrolidone) fraction some salt originating from the Na+ ions used for partial neutralization of the polyacid and anions from the acid used in the precipitation, plus a small excess of the acid used. There are different ways of removing the ions if this is desired, of which deionization on a mixed-bed ion exchange column, or electrodialysis is preferred. After percolation of a deionizing column, the solution contains only the desired poly(vinylpyrrolidone).

As previously indicated, the choice of $\alpha$, i.e., the size of the fraction of poly(vinylpyrrolidone) to be removed depends on the molecular weight distribution of the starting material and of the distribution desired. It is self-evident that for an economic process one would choose a starting material the distribution of which would differ least of the desired end product.

The removed poly(vinylpyrrolidone) can be regenerated from the complex, by dissolving the latter in base, evaporating the water and extracting the liberated poly(vinylpyrrolidone) with e.g. chloroform. Another method consists in precipitating the polyacid from its basic solution by a polyvalent cation such as e.g. $Ca^{++}$. The poly(vinylpyrrolidone) thus liberated has a rather narrow molecular weight distribution which falls off unusually steeply on the low molecular weight end of the curve.

In practice, the fractionation is conducted in an inert, normally liquid solvent in which complexing can occur in the homogeneous phase. Illustrative solvents which can be employed include, among others, water, organic solvents such as, alcohols e.g. methanol, ethanol and the like; benzene, toluene, and the like; the chlorinated hydrocarbons, e.g., chloroform, carbon tetrachloride, and the like. Although an aqueous medium is preferred in poly(vinylpyrrolidone) fractionation, the complex formation can also be effected conveniently in methanol. When using methanol it was noted that the use of an organic base, e.g., butylamine, may be required to prevent precipitation of the partially neutralized polyacid.

Fractionation of the present invention is different from essentially all other methods in that it consists in selectively converting a fraction of the polymer into a physico-chemically different species while in solution, i.e., fractionation in the homogeneous phase. The separation of the newly created species is then accomplished in more than one way, e.g. precipitation, adsorption, electrophoresis or electrodecantation, extraction, centrifugation and the like.

As indicated before, the complexing auxiliary polymer must have the right kind of periodicity and steric requirements to permit complexation on sufficiently long stretches along the chain, to make it chain length selective. Polymers that do not exhibit the right kind of periodicity produce no selectivity in complexation. An example of this behavior is shown by tannic acid and random copolymer of ethylene and acrylic acid. They complex and precipitate more than stoichiometric amounts of poly(vinylpyrrolidone) and the precipitation does not produce a selective fractionation. Others, such as alginic acid, and carboxy methyl cellulose also form complexes which however are extremely hydrophilic and could not be separated from the free poly(vinylpyrrolidone) by the techniques set forth above. It has been found that when fractionating poly-(vinylpyrrolidone of K=30 and lower, even rather low molecular weight polyacrylic acid (<50,000) was effective. It appears also unnecessary to have very long linear chain segments between branching points. For example, the polyacid produced by hydrolyzing a branched ethylene-maleic acid copolymer as indicated in Example VI, or a branched polyacrylic acid such as Carbopol 341, gave good selectivity.

As previously indicated, two classes of polymers have shown very good selectivity, easy handling characteristics and availability. The two are isomers; polyacrylic acid and copoly(ethylene-maleic acid) corresponding to a head to tail

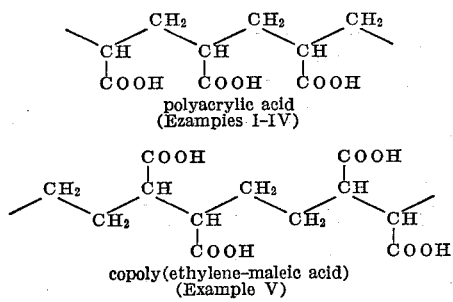

resp. head to head arrangement of acrylic acid. Both polymers form complexes with poly(vinylpyrrolidone) in the ratio COOH:pyrrolidone 1:1. The physical nature of the precipitated complex is, however, somewhat different: the former precipitates as a tough curd while the latter forms a more crumbly mass. However, the selectivity of fractionation is equally good with both. An example of unfavorable steric conditions is the 1:1 copolymer of styrene and maleic acid. Although the periodicity of this polymer is essentially the same as that of copoly(ethylene-maleic acid), it combines with PVP in a non-stoichiometric ratio (up to 8 PVP to one copolymer), precipitates much more of it and most significantly not selectively. It appears that the presence of the bulkier phenyl groups prevent the formation of side-by-side associations and therefore the selectivity with respect to molecular weight is lost.

As hereinbefore indicated, the fractionation technique of this invention is not limited to poly(vinylpyrrolidone) but is applicable to a wide variety of polymers which form complexes with other macromolecules in the homogeneous phase. The high molecular weight poly(alkylene oxides) can conveniently be fractionated by this process. For example, polyethylene glycol having a molecular weight as low as 6000, and a specific viscosity at 1 percent of 0.222, after fractionation had a specific viscosity of 0.176. However, since the complexes for the low molecular weight polymer will not precipitate from water, it is preferred to effect separation by other methods, e.g., electrophoresis, electrodecantation, and the like. The free polymers being uncharged do not move in an electric field whereas the complex is negatively charged and migrates to the anode. The same applied to poly(vinylpyrrolidone) of low molecular weight (R<6).

The following examples are illustrative:

EXAMPLE 1

A poly(vinylpyrrolidone) sample sold under the trade name Plasdone C [1] and which was characterized by a relative viscosity of 1.237 (one weight percent aqueous solution) and a K-value of 29.9 was subjected to the fractionation treatment indicated below.

Ten grams (0.090 formula weight of monomer) of Plasdone C are added to 30 milliliters of water in a 250 milliliter capacity Waring Blendor while stirring at low speed. After five minutes, when dissolution is complete, 0.973 grams (0.013 equivalent; $\alpha=0.15$) of polyacrylic acid [2] is added as a 24 percent solution, the pH of which has been raised to 4.2 with 0.140 gram sodium hydroxide. Mixing of the two solutions is complete, with a pH of 4.8 after stirring for one minute. With continuous stirring and pH monitoring, 4.1 milliliters of 1 N HCl are added from a burette at a rate of one milliliter per minute. To prevent local precipitation, the acid is dropped in the vortex resulting from the stirring. At pH 4.2 acid addition is halted for one minute but stirring continued to allow complex equilibration. Precipitation is complete at a final pH of 2.0. This mixture is then stirred at high speed for three more minutes. Due to the vigorous stirring the temperature of the reaction mixture rises by about 20° C. After settling for a minute or two, the precipitate is essentially all in the foam which floats on top of the clear solution containing the desired product. The precipitate, composed of 15 percent of the starting poly(vinylpyrrolidone) and all the polyacrylic acid is lifted off, then the clear solution suction filtered through a medium porosity fritted glass filter to remove the last flakes of precipitate. The clear solution containing the desired poly(vinylpyrrolidone) is liberated from $Na^+$ and $Cl^-$ ions by passing through a mixed bed ion-exchange resin column. From the effluent, 8.5 grams of poly(vinylpyrrolidone) are isolated by evaporation of the water in vacuo. The product is characterized by the gel chromatogram B of FIG. 1 and by a relative viscosity in one weight percent solution of 1.174 and corresponding K-value of 25.0. The gel chromatogram A of FIG. 1 represents the molecular weight distribution of the poly-(vinylpyrrolidone) prior to fractionation.

EXAMPLE 2

A poly(vinylpyrrolidone) sample characterized by a relative viscosity of 1.090 (one weight percent aqueous solution) and a K-value of 15.6 was subjected to the fractionation employed in Example 1. As in the first example, the precipitate contains 15 percent of the original poly(vinylpyrrolidone) and all the polyacrylic acid. Only 7.6 grams of the final product are recovered due to losses in the ion exchange column. This product is characterized by a relative viscosity in one percent solution of 1.068 and K-value of 14.25. The molecular weight distribution is shown in the gel chromatogram B of FIG. II. The gel chromatogram A of FIG. II represents the molecular weight distribution of the poly(vinylpyrrolidone) prior to fractionation.

EXAMPLE 3

A 10.0 gram sample of poly(vinylpyrrolidone) characterized by a relative viscosity of 1.236 (one weight percent aqueous solution) and K-value of 29.6, is subjected to a fractionation treatment similar to that described in Example 1, with the exception that twice as much polyacrylic acid is used. Thus the ratio of gram formula weights used, poly(vinylpyrrolidone)/poly- ---
[1] General Aniline and Film Corporation.
[2] Grade A-1, Rohm and Haas Co.

acrylic acid, is 0.090/0.027 (α=0.30). In order to achieve a final pH of 2.0, 8.1 milliliters of 1 N HCl are added. The precipitate contains 30% of the original poly(vinylpyrrolidone), as well as all the polyacrylic acid. Seven grams of the desired product are isolated. This product, poly(vinylpyrrolidone), is characterized by a relative viscosity of 1.142 (one weight percent aqueous solution), K-value of 22.25, and molecular weight distribution as shown in the gel chromatogram B of FIG. III. The gel chromatogram A of FIG. III represents the molecular weight distribution of the poly(vinylpyrrolidone) prior to fractionation.

EXAMPLE 4

A poly(vinylpyrrolidone) sample characterized by a relative viscosity of 1.090 (one weight percent aqueous solution) and K-value of 15.6, is subjected to a fractionation procedure similar to that described in Example 1, with the exception that the ratio of gram formula weights used, poly(vinylpyrrolidone)/polyacrylic acid, is 0.090/0.027 (α=0.30). In order to achieve a final pH of 2.0 it is necessary to add 8.1 milliliters of 1 N HCl. The precipitate contains 30 percent of the original poly(vinylpyrrolidone) and all the polyacrylic acid. 6.9 grams of poly(vinylpyrrolidone) are recovered from the clear solution. This product is characterized by a relative viscosity of 1.062 (one weight percent aqueous solution) and corresponding K-value of 13.5. The molecular weight distribution is shown in the gel chromatogram B of FIG. IV. The gel chromatogram A of FIG. IV represents the molecular weight distribution of the poly(vinylpyrrolidone) prior to fractionation.

EXAMPLE 5

A sample of poly(vinylpyrrolidone) characterized by a relatively viscosity of 1.236 (one weight percent aqueous solution) and K-value of 29.6, is subjected to a treatment similar to that of Example 1. In place of the polyacrylic acid, the copolymer of ethylene maleic acid [3] is used as complexing agent. 1.71 grams (0.013 formula weight) of the polymer is refluxed as a 10% aqueous solution for one hour in order to convert the maleic anhydride to the acid, then by adding 0.240 grams of sodium hydroxide the pH is raised to 4.5. This solution is added to the poly(vinylpyrrolidone) solution instead of polyacrylic acid in the previous examples (α=0.30). In order to achieve complex precipitation the pH has to be lowered to 1.5 for which 11.6 milliliters 1 N HCl are necessary. The desired product, 5.9 grams, is isolated from the clear solution as before after deionization. This product is characterized by a relative viscosity of 1.151 (one weight percent aqueous solution) with corresponding K-value of 23.0. The molecular weight distribution is shown by gel chromatogram B of FIG. V. The gel chromatogram A of FIG. V represents the molecular weight distribution of the poly(vinylpyrrolidone) prior to fractionation.

EXAMPLE 6

A sample of poly(vinylpyrrolidone) characterized by a relative viscosity of 1.236 (one weight percent aqueous solution) and K-value of 29.6, is subjected to a treatment similar to that of Example IV. In place of the polyacrylic ---
[3] Identified as EMA-21, Monsanto Co.

acid, 1.71 grams (0.0131 formula weight) of a cross linked ethylene-maleic acid copolymer [4] is used as the complexing agent. Due to the high viscosity of hydrolyzed solutions of this polymer, it is used in no more than one percent concentration. Hydrolysis is effected by heating under reflux for two hours, then adding 0.24 gram NaOH to raise the pH to 4.5. In order to lower the pH to 1.5, 11.6 milliliters of 1 N HCl are added. Due to formation of a viscous lather during acid addition, stirring must be at high speed in order to have complete mixing. The acid is added at a rate of 0.5 milliliter per minute. After pH 1.5 has been reached, the mixture is stirred for five more minutes with an overall temperature rise of about 30°, then the desired product isolated as before. 7.2 grams poly(vinylpyrrolidone) are isolated. This product is characterized by a relative viscosity of 1.147 (one weight percent aqueous solution) with corresponding K-value of 22.8. The molecular weight distribution is shown in gel chromatogram B of FIG. VI. The gel chromatogram A of FIG. VI represents the molecular weight distribution of the poly(vinylpyrrrolidone) prior to fractionation.

Although the invention has been illustrated by the preceding examples, it is not to be construed as being limited to the materials employed therein, but rather, the invention encompasses the generic area as hereinbefore disclosed. Various modifications and embodiments of this invention can be made without departing from the spirit or scope thereof.

---
[4] Identified as EMA-91, Monsanto Co.

What is claimed is:

1. A process for separating the highest molecular weight fraction from poly(vinylpyrrolidone) which comprises the steps of:
    (a) forming an aqueous solution of poly(vinylpyrrolidone),
    (b) contacting said solution with less than an equivalent of a polyacid selected from the class consisting of polyacrylic acid, or copoly(ethylene-maleic acid),
    (c) adjusting the pH of said solution to less than about 4.0 whereby a complex is formed between said polyacid and the highest molecular weight fraction of said poly(vinylpyrrolidone),
    (d) separating said complex, and
    (e) recovering said poly(vinylpyrrolidone) freed from its highest molecular weight fraction.

2. The process of claim 1 wherein said complex is separated by precipitation in lowering the pH to less than about 2.5.

References Cited

UNITED STATES PATENTS

| | | | |
|---|---|---|---|
| 2,255,388 | 9/1941 | Kune et al. | 260—94 |
| 2,634,259 | 4/1953 | Ney et al. | 260—88.3 |
| 2,265,450 | 12/1941 | Reppe et al. | 260—88.3 |
| 2,739,922 | 3/1956 | Shelanski | 424—80 |
| 3,331,798 | 7/1967 | Hibbard | 260—29.6 |

WILLIAM H. SHORT, Primary Examiner

E. A. NIELSEN, Assistant Examiner

U.S. Cl. X.R.

260—2 A, 29.6 WB, 29.6 PT, 29.6 NR, 80 R, 88.1 PC, 874, 895; 424—80